United States Patent [19]

Kobayashi

[11] Patent Number: 4,559,463
[45] Date of Patent: Dec. 17, 1985

[54] LARGE SURFACE AREA PERMANENT MAGNET TYPE ROTARY ELECTRICAL MACHINE

[75] Inventor: Hideaki Kobayashi, Sakura, Japan
[73] Assignee: Hitachi, Ltd., Tokyo, Japan
[21] Appl. No.: 630,246
[22] Filed: Jul. 12, 1984

[30] Foreign Application Priority Data

Jul. 27, 1983 [JP] Japan .................. 58-135980

[51] Int. Cl.$^4$ ............................ H02K 21/12
[52] U.S. Cl. .................... 310/156; 310/211; 310/261
[58] Field of Search ......... 310/211, 212, 218, 40 MM, 310/156, 166, 162, 163, 164, 261

[56] References Cited

U.S. PATENT DOCUMENTS

| | | | |
|---|---|---|---|
| 2,060,259 | 11/1936 | Spengler | 310/156 |
| 2,939,025 | 5/1960 | Williford | 310/156 |
| 4,127,786 | 11/1978 | Volkrodt | 310/156 |
| 4,139,790 | 2/1979 | Steen | 310/212 |
| 4,188,554 | 2/1980 | Binns | 310/156 |
| 4,358,696 | 11/1982 | Liu | 310/156 |
| 4,358,697 | 11/1982 | Liu | 310/156 |
| 4,476,408 | 10/1984 | Honsinger | 310/156 |

FOREIGN PATENT DOCUMENTS

| | | | |
|---|---|---|---|
| 1563278 | 4/1970 | Fed. Rep. of Germany | 310/212 |
| 0148214 | 11/1979 | Japan | 310/156 |
| 0077359 | 6/1980 | Japan | 310/156 |
| 0235004 | 6/1925 | United Kingdom | 310/156 |
| 0359671 | 10/1931 | United Kingdom | 310/156 |
| 1177247 | 1/1970 | United Kingdom | 310/156 |

Primary Examiner—R. Skudy
Attorney, Agent, or Firm—Beall Law Offices

[57] ABSTRACT

An electrical rotary machine having permanent magnets, is provided with an armature core and field core. The permanent magnets are disposed within either the armature core or the field core of the machine. The permanent magnets forming adjacent magnetic poles are disposed in coaxial circles at different radii from the axis of the rotation of the machine, with the ends of these cores spaced from each other when viewed along the axis of rotation. The ends of cores are overlapped and spaced radially from each other.

16 Claims, 4 Drawing Figures

1

LARGE SURFACE AREA PERMANENT MAGNET TYPE ROTARY ELECTRICAL MACHINE

TECHNICAL FIELD

This invention relates to an electrical rotary machine having permanent magnets and provided with an armature core and a field core.

BACKGROUND ART

Saturated magnetic flux density of a core material used in armature cores or field cores generally occurs at 19,000 to 21,000 gauss or so.

Miniaturized permanent magnets having mighty electromotive forces have been developed recently; however, the magnetic flux density of the surface of these permanent magnets is in the range of 2,500 to 3,000 gauss or so in most magnets formed of ferrites. Even with magnets formed of rare earth elements to ensure the highest magnetic flux density, the flux density on their surfaces runs only at 6,000 to 8,000 gauss or so. Therefore, the core material may allow the magnetic flux of a magnet using rare earth elements which are about three times as large as the core in area, to pass therein.

Consequently, for miniaturization of an electrical rotary machine having permanent magnets, it is essential that an arrangement of the permanent magnets will be taken into consideration so as to dispose the permanent magnets with the largest possible pole-face area in the smallest possible space.

In view of the above requirements, the applicant proposed an arrangement of permanent magnets for pole cores as disclosed in Japanese Patent Laid-Open No. 77359/1980.

The structure is such that a permanent magnet of circular arc in section rectangular to an axis of rotation is disposed with its one end facing near a rotating shaft and the other end facing near the outer periphery of a pole core, therefore an electromotive force waveform reaching an armature core includes many an odd harmonic, which does not ensure a good characteristic in electrical rotating machinery.

SUMMARY OF THE INVENTION

Accordingly, it is an object of the present invention to provide an improved rotating electric motor.

It is another object to provide a rotating electric motor having a plurality of pole faces with large surface areas.

It is a further object to provide a rotating electric motor having a plurality of pole faces with large surface areas and undistorted magnetic flux fields.

This invention has been made in view of the circumstances mentioned above, and its object is to provide a rotating electrical machine having permanent magnets with good characteristics and suitable for miniaturization.

In this invention, both permanent magnets forming adjacent magnetic poles are disposd in coaxial arcs at different distances from an axis of rotational motion with the ends spaced from each other when viewed radially from the axis of rotation.

According to such constitution, a permanent magnet with large pole face area can be disposed with the pole-face coming directly in the direction where an armature core is positioned, therefore an electrical rotary machine having a permanent magnet which is superior in characteristics and miniaturized in addition can be constituted.

DETAILED DESCRIPTION OF THE INVENTION

Figure 1:
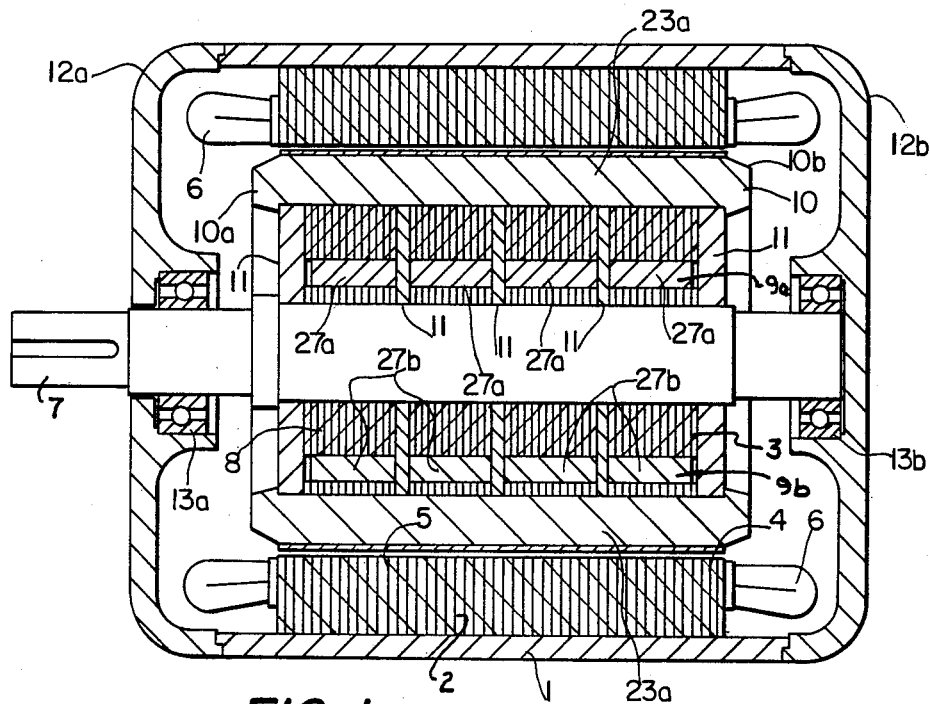
FIG. 1 is a longitudinal cross-sectinal view representing one embodiment of electrical rotary machines having permanent magnets according to this invention, wherein a rotor is shown taken along the line I—I' of FIG. 2.
Figure 2:
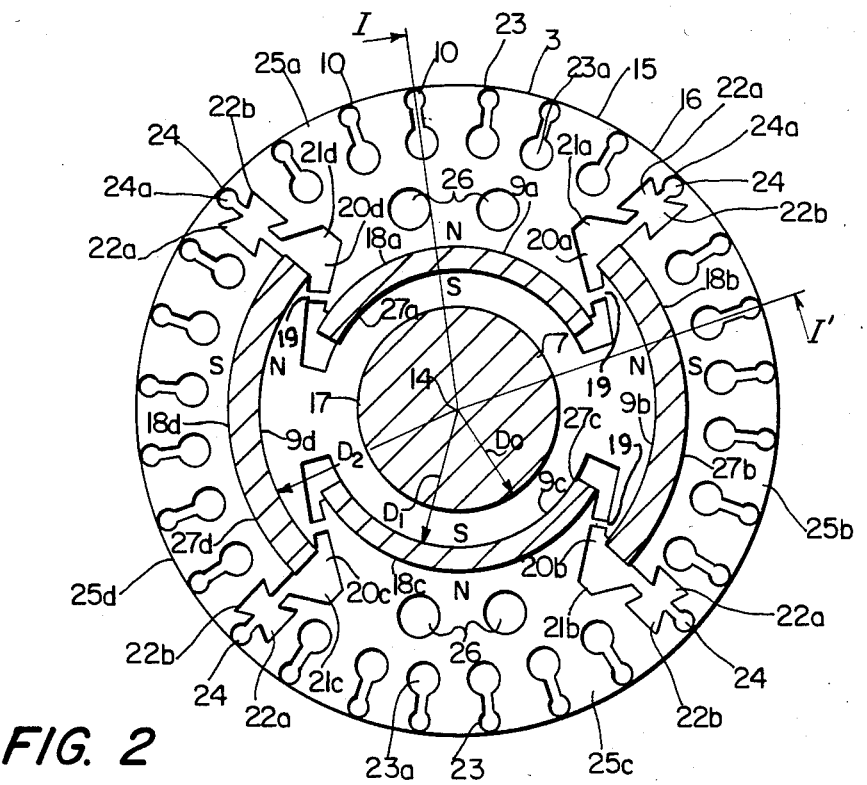
FIG. 2 is a transverse cross-sectional view of the rotor given in FIG. 1.
Figure 3:
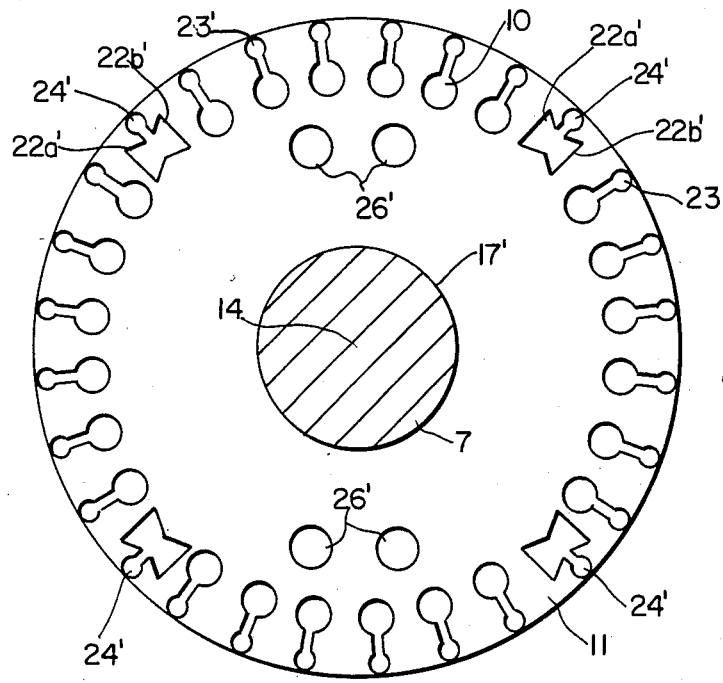
FIG. 3 is a front view of a reinforcing member shown in FIG. 1.

FIGS. 1 to 3 represent a case where the invention is put into practice on a four-pole revolving permanent magnetic field type synchronous motor.

The embodiment will be described as follows.

An armature core 2 is fixed in a cylindrical outer frame 1. The armature core 2 has a circular hole 5 opposite to the outer periphery of a rotor 3 through a gap 4 at the center. Then, the armature core 2 has a multitude of slots (not illustrated) open toward the hole 5, and an armature winding 6 is incorporated in the slots so as to form a four-pole revolving field.

The rotor 3 is constituted of a rotating shaft 7, a pole core 8, permanent magnets 9a and 9d same in number as that of poles, a double cage winding 10 and a reinforcing plate 11.

The rotating shaft 7 is supported rotatably by end covers 12a, 12b fixed on both ends of the outer frame 1 through bearings 13a, 13b. An axis of rotation 14 of the rotating shaft 7 coincides with the center of the holes 5. Then, the rotating shaft 7 is detented from rotating further to the pole core 8 so as to devise a mechanical output of the pole core 8 externally. Either a magnetic substance or non-magnetic substance can be used as a material for the rotating shaft 7. The pole core 8 is constituted of a multitude of punched iron plates 15 laminated in the longitudinal direction of the rotating shaft 7. The punched iron plates 15 have a circular outer perimeter 16 and are also provided with a through hole 17 at the center in which the rotating shaft 7 is fitted tightly. Further, the punched iron plate 15 has small-radius-arched punched zones (openings) 18a, 18c for nesting the permanent magnets 9a, 9c at positions isolated by $D_1$ from the axis of rotation 14 and large-radius-arched punched zones (openings) 18b, 18d for nesting the permanent magnets 9b, 9c at positions isolated by $D_2$.

Then, dimensions of $D_1$ and $D_2$ are selected in the following relation:

$$D_0 < D_1 < D_2$$

where $D_0$ is a radius of the through hole 17.

These are constituted such that the center of circular arcs of the small-radius-arched punched zones 18a, 18c and the large-radius-arching punched zones 18b, 18d will coincide with the axis of rotation 14 (this is advantageous to facilitate skewing of the pole core), and those 18a, 18c and 18b, 18d are points disposed symmetrically about the axis of rotation 14.

In this embodiment the constitution is further such that the end portions of the small-radius-arched punched zones 18a, 18c and the large-radius-arched punched zones 18b, 18d are overlapped somewhat spaced from each other when viewed along the axis of rotation 14, namely the sum of the subtended angles of these circular arcs will be geometrically greater than 360°.

The punched iron plate 15 has punched zones 20a to 20d extending from ends of the small-radius-arched punched zones 18a, 18c near to the outer perimeter 16 with some bridge 19 left behind between the small-radius-arched punched zones 18a, 18c and the large-radius-arched punched zones 18b, 18d, thus forming increased reluctance zones 21a to 21d which may be filled with non-magnetic for minimizing leakage of a magnetic flux by the permanent magnets 9a to 9d without passing the armature core 2.

The punched zones 20a to 20d have dovetail punched zones 22a, 22b opposite each other. The same material as the casting material for the double cage winding 10 is cast in the punched zones 20a to 20d, which include increased reluctance zones 21a-20d including the dovetail punched zones 22a, 22b when casting the double cage winding 10. Therefore, portions cast in the dovetail punched zones 22a, 22b may function as wedges. Further, the bridges 19 are narrowed so that a magnetic saturation is obtainable on a slight magnetic flux. The double cage winding 10 is cast through the slots 23 near the outer perimeter 16 of the punched iron plate 15.

Zones 24 for casting the double cage winding 10 is also punched outside the reluctance increased zones 21a to 21d, continued from the punched zones 20a to 20d. The punched iron plate 15 has punched holes 26 for adjusting the reluctance of magnetic poles 25a, 25c to that of magnetic poles 25b, 25d positioned on the outside of the large-radius-arched circular punched zones 18b, 18d on the outside of the small-radius-arched punched zones 18a, 18c.

As illustrated in detail in FIG. 3, a reinforcing plate 11 has an outer diameter of the same size as the outer diameter of the punched iron plate 15. Further, it is provided with a through hole 17' in which the rotating shaft 7 is fitted tightly, and also slot forming holes 23', 24' for casting the double cage winding 10. A part of the slot forming hole 24' has dovetail punched zones 22a', 22b' opposite each other. The reinforcing plate 11 is constituted of a non-magnetic substance. A numeral 26' denotes a punched holes provided at the positions corresponding to the punched holes 26.

The punched iron plates 15 and the reinforcing plates 11 with the configuration described above are so laminated that the reinforcing plates 11 are provided on both ends and intermediately and the slot forming holes 23 and 23', 24 and 24' respectively aligned in the direction, or somewhat skewed in the axial direction and then fitted tightly on the rotating shaft 7. The punched plates between the opposed reinforcing plates 11 are so laminated that the small-radius-arched punched zones 18a, 18c and the large-radius-arching punched zones 18b, 18d are aligned with each other, thus forming 27a, 27c for small-radius-arched permanent magnets and chambers 27b, 27d for large-radius-arched permanent magnets respectively. Then, the small-radius-arched permanent magnets 9a, 9c nest in the chambers 27a, 27c and the large-radius-arched permanent magnets 9b, 9d nest in the chambers 27b, 27d, respectively. The permanent magnets 9a to 9d are disposed electrically at 18-degree intervals, and ends of the adjacent permanent magnets are overlapped and spaced from each other when viewed radially from the axis of rotation 14. Here, the permanent magnets 9a to 9d are so magnetized that a polarity of outer periphery of the large-radius-arched permanent magnets will be "S" against that of small-radius-arched permanent magnets 9a, 9c which works at "N".

Aluminum or aluminum alloy is cast in slots 23a, 24a which are so formed by connecting the slot forming holes 23, 23' and 24, 24' thereby forming the double cage winding 10. Numerals 10a, 10b denote end rings of the double cage winding.

Aluminum or aluminum alloy is also cast in the punched zones 20a to 20d and the dovetail punched zones 22a, 22b, 22a', 22b', and also aluminum or aluminum alloy is cast in a clearance between the small-radius-arched permanent magnet chambers 27a, 27c and the small-radius-arched permanent magnets 9a, 9c and in a clearance between the large-radius-arched permanent magnet chambers 27b, 27d and the large-radius-arched permanent magnets 9b, 9d.

Nothing will be cast in the punched holes 26, 26', which may serve as ventilating holes.

In the above constitution, when the armature winding 6 is energized, the rotor 3 first starts as an inductor according to the double cage winding 10, a pull in is made whenever it runs near a synchronous speed, and then it operates as a synchronizer thereafter. While it operates as a synchronizer, the double cage winding 10 works as a damper winding.

Figure 4:
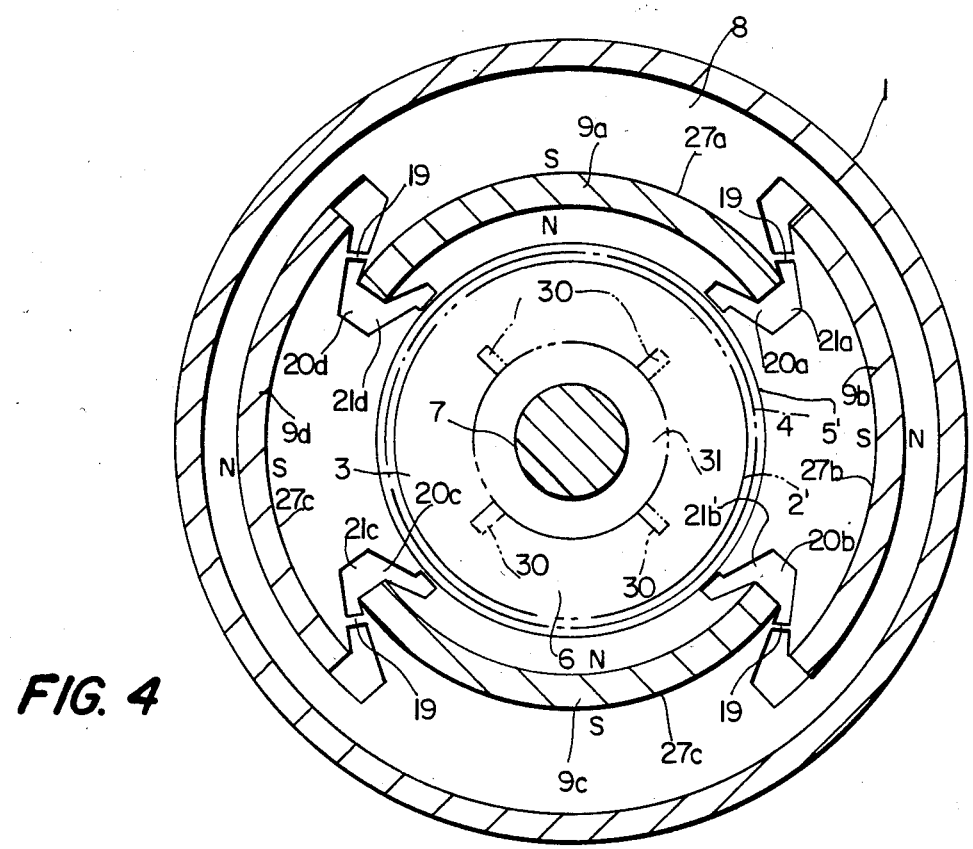
FIG. 4 is a transverse cross-sectional view representing an electrical rotary machine given in another embodiment of this invention.

FIG. 4 represents a case where the invention is put into practice on a four-pole DC motor. In the embodiment, the pole core 8 is fixed on the outer frame 1, and an armature 2' runs in a circular hole 5' provided in the pole core 8. A constitution is therefore such that a DC power is supplied to the armature winding 6 through a brush 30 and a commutator 31.

The pole core 8 has a small-radius-arched permanent magnet chambers 27a, 27c, in which the small-radius-arched permanent magnets 9a, 9c nest, and also large-radius-arched permanent magnet chambers 27b, 27d, in which the large-radius-arched permanent magnets 9b, 9d nest. When the N-poles of the permanent magnets 9a, 9c face a position whereat the armature core 2 is kept, the S-poles of the permanent magnets 9b, 9d face the position whereat the armature core 2 is kept. The adjacent permanent magnets are disposed at a different distance from the axis of rotation 14, and the ends overlap each other at intervals when viewed radially from the axis of rotation 14.

The punched zones 20a to 20d are provided between adjacent magnetic poles as reluctance increased zones 21a to 21d, and portions of the pole core 8 coming inside and outside of the permanent magnets 9a to 9d are connected through the bridge 19 for easy magnetic saturation.

As will be apparent from what has been described above, according to these embodiments, permanent magnets forming adjacent magnetic poles are disposed in pairs of coaxial arcs (e.g., in coaxial circles) with each pair disposed at a different radius from the axis of rotation for rotational motion. Furthermore, the ends are overlapped and spaced from each other, in this case, when viewed radially from the axis of rotation; therefore permanent magnets with large pole-faces can be disposed with the pole-faces facing directly to the position whereat an armature core is kept. An electrical rotary machine having permanent magnets which are superior in characteristics and miniaturized in addition can be consequently constituted.

I claim:

1. A rotary electric machine, comprising:
a stator having a stator core;
a rotor having a rotor core coaxially disposed inside of said stator core, and a rotatable shaft; and
a plurality of pairs of arc-shaped permanent magnets disposed within said rotor core, to provide a plurality of adjacent magnetic poles, said permanent magnets being disposed symmetrically about the axis of said shaft, each of said pairs of magnets being concentric and at different distances from said axis, the ends of said permanent magnets forming said adjacent magnet poles overlapping each other at intervals viewed radially from said axis, said rotor core having increased reluctance zones between the ends of said permanent magnets forming said adjacent magnetic poles.

2. The machine of claim 1, wherein said rotor has a cage winding.

3. The machine of claim 2, wherein said increased reluctance zones of said rotor core are filled with a non-magnetic substance.

4. The machine of claim 3, wherein said non-magnetic substance has the same composition as said cage winding.

5. A rotary electric machine, comprising:
a stator having a stator core;
a rotor having a rotor core coaxially disposed inside of said stator core, and a rotatable shaft;
a plurality of pairs of arc-shaped permanent magnets disposed within said stator core, to provide a plurality of adjacent magnetic poles, said magnets being disposed symmetrically about the axis of said shaft, each of said pairs of magnets being concentric and at different distances from said axis, the ends of said permanent magnets forming said adjacent magnetic poles overlapping each other at intervals when viewed radially from said axis, said stator core having increased reluctance zones between the ends of said permanent magnets forming said adjacent magnetic poles.

6. The machine of claim 5, wherein said increased reluctance zones are filled with a nonmagnetic substance.

7. The machine of claim 4, wherein said increased reluctance zones adjust the reluctance of magnetic poles along smaller-radius-arcs to the reluctance of magnetic poles positioned on the outside of larger-radius-arcs located on the outside of said smaller-radius-arcs.

8. The machine of claim 1, wherein said rotor core includes means for adjusting reluctance of said magnetic poles.

9. A rotor for a rotary electric machine, comprising:
a rotor having an axially extended rotor core coaxially disposable within a stator core, and having a cage winding;
a shaft disposed at the center of said rotor core; and
a plurality pairs of permanent magnets disposed within said rotor core and extending circumferentially around said center to provide a plurality of adjacent magnetic poles, said permanent magnets disposed symmetrically about the axis of said shaft, each pair of said magnets being concentrically disposed at different distances from said axis, of said permanent magnets forming said adjacent magnetic poles overlapping each other at intervals when viewed radially from said axis, said rotor core having increased reluctance zones between the ends of said permanent magnets forming said adjacent magnetic poles.

10. The machine of claim 9, wherein said permanent magnets include a first pair of arc-shaped permanent magnets disposed at a position separated by a smaller distance from said axis and second pair of arc-shaped permanent magnets disposed at a position separated by a longer distance from said axis.

11. The machine of claim 10, wherein said first and second pair of arc-shaped permanent magnets are disposed in coaxial circles at different radii from said axis.

12. The machine of claim 9, wherein the ends of said permanent magnets forming said adjacent magnetic poles radially overlap each other.

13. The machine of claim 10, wherein said increased reluctance zones are between the ends of said first and second pairs of arc-shaped magnets.

14. The machine of claim 9, wherein said increased reluctance zones of said rotor core are filled with a non-magnetic substance.

15. The machine of claim 14, wherein said non-magnetic substance has the same composition as said cage winding.

16. The machine of claim 9, wherein said rotor core includes means for adjusting reluctance of said magnetic poles.

* * * * *